Oct. 16, 1923.
J. G. WILCOX
SPINDLE BOLT PROTECTOR
Filed Dec. 6, 1921
1,471,227
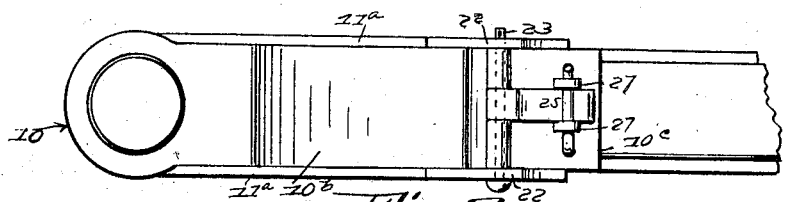
Fig. 3.
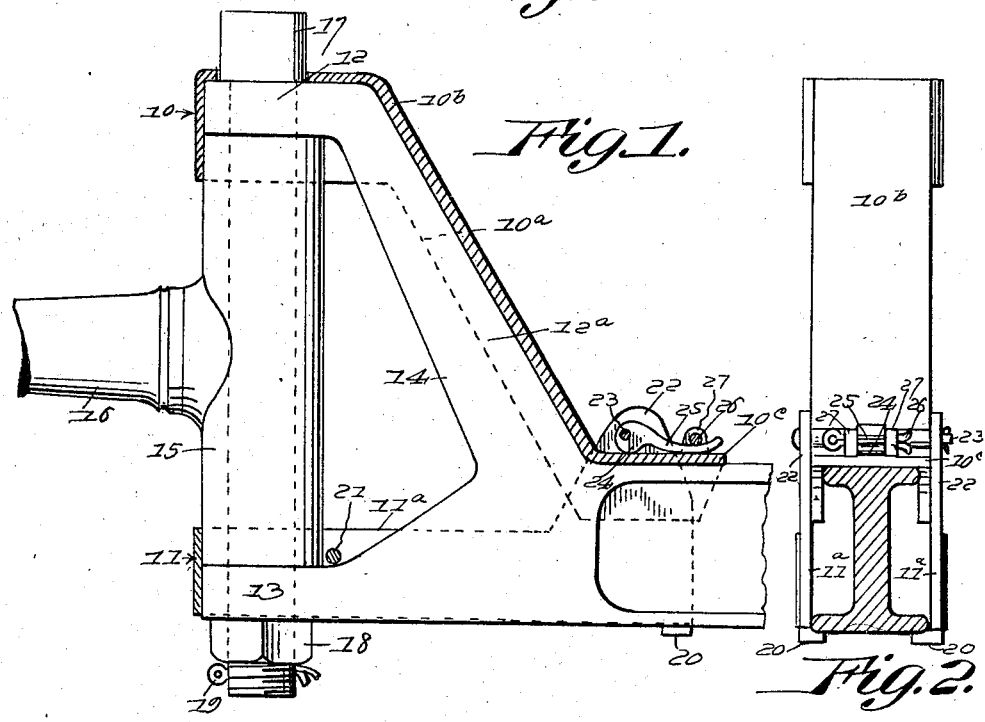
Fig. 1.
Fig. 2.
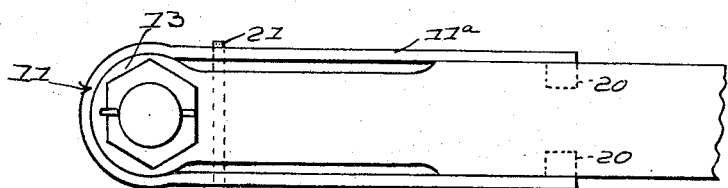
Fig. 4.
Inventor
James G Wilcox,
By
Attorney Patented Oct. 16, 1923.

1,471,227

UNITED STATES PATENT OFFICE.

JAMES G. WILCOX, OF BRADLEY, WISCONSIN.

SPINDLE-BOLT PROTECTOR.

Application filed December 6, 1921. Serial No. 520,225.

*To all whom it may concern:*

Be it known that JAMES G. WILCOX, a citizen of the United States of America, residing at Bradley, in the county of Lincoln and State of Wisconsin, has invented new and useful Improvements in Spindle-Bolt Protectors, of which the following is a specification.

The object of the invention is to provide a simple and efficient means for protecting and acting as a retainer for the spindle bolt of a vehicle of the automobile type, and as a means of preventing the dismounting of the spindle in the event of displacement or breakage of the bolt, or to serve as an emergency means of holding the spindle carrying sleeve in proper position with relation to the bracket of the knuckle to permit of the operation of the car in the event of displacement or breakage of the bolt; and with this object in view the invention consists in a construction and combination of parts of which a preferred embodiment is shown in the accompanying drawings, wherein:—

Figure 1 is a sectional view of a spindle retaining device embodying the invention applied in the operative position to a steering wheel knuckle.

Figure 2 is an elevation taken from the inner side of the same, showing the axle in section.

Figure 3 is a plan view of the same.

Figure 4 is an inverted plan view thereof.

The device consists of upper and lower collars 10 and 11 adapted to receive the upper and lower bearing eyes 12 and 13 of the knuckle bracket 14, said collars being of a depth exceeding the thickness of the eyes 12 and 13 so as to overlap the remote end portions of the sleeve 15 which carries the wheel spindle 16 and through which extends the spindle bolt 17 secured in place as in the ordinary practice by means of a nut 18 and cotter pin 19.

The collars are provided with means for holding them respectively in engagement with the bracket eyes in said overlapping relation with the extremities of the spindle carrying sleeve, so as to serve as a means of retaining said sleeve in a rotative condition between the eyes of the knuckle bracket whether the knuckle bolt 17 is in place or not, and in the construction illustrated the means whereby said collars are thus held in position consist of inward extensions 10$^a$ and 11$^a$ of the collars respectively parallel with the arms of the bracket to a point of intersection on the axle inside of the inclined arm 12$^a$ of the bracket, and a locking device connecting the inner ends of said extensions to bind the same upon the axle.

The cuff 10 which engages the upper eye is preferably provided with a back 10$^b$ which extends over the eye, with a suitable opening for the accommodation of the upper headed end of the knuckle bolt 17 and thence extends downward along the inclined inner surface of the arm 12$^a$ and then horizontally as shown at 10$^c$ to bear upon the upper surface of the axle. This back serves as a connection, preferably integral, between the side portions 10$^a$ of the cuff extension which lie in contact with the side surfaces of the bracket arm 12$^a$ as do the extensions 11$^a$ of the lower cuff with relation to the lower or substantially horizontal arm of the bracket.

At their inner ends the extensions of the lower cuff are provided with horizontally extended ears 20 to underlap and lie in contact with the lower surface of the axle, and at intermediate points preferably close to the sleeve 15 the side extensions of the lower cuff are transversely connected by a bolt 21 resting on the upper surface of the lower bracket eye.

Also at the inner ends of the side extensions of the lower cuff there are arranged upwardly extending side ears 22, extending above the plane of the upper side of the axle and also of the back extension member 10$^c$, and mounted between said ears and on a transverse spindle or pin 23 connecting the same is a cam 24 having a handle 25 for engagement by a cotter pin 26 extending through keepers 27 carried by and rising from the back extension 10$^c$.

When the members of the retainer are arranged as indicated and are secured by the bolt 21 to prevent downward displacement of the lower cuff 11 and by the locking device represented as above described by the cam carried by the upstanding ears 22 and bearing upon the horizontal back extension 10$^c$ of the upper cuff, the displacement in any direction of the cuffs is prevented and the knuckle bearing sleeve 15 is locked in position against displacement even though the knuckle bolt should be absent. Obviously there will be an undesirable looseness of the sleeve when so held and which is avoided by the use of the knuckle bolt, but as an emergency means of holding the sleeve, in the event of breakage or displacement of the knuckle bolt, the device will serve every purpose necessary to permit of the operation of the car until such time as the replacement of the knuckle bolt may be effected.

Having described the invention, what is claimed as new and useful is:—

1. A retainer for the axle carrying sleeve of a steering knuckle having cuffs embracing the eyes of the knuckle bracket in overlapping relation with the adjacent extremities of the sleeve, said cuffs having side extensions lying in contact with the side surfaces of the bracket arms and means for securing the inner ends of said extensions in a fixed relation with the axle, the extensions of the lower cuff being provided with ears for engagement with the under surface of the axle and the extensions of the upper cuff being provided with a back extension bearing upon the upper side of the axle, and said fastening means consisting of ears extending upward from the extensions of the lower cuff, and a cam mounted between said ears for engagement with said back extension of the upper cuff.

2. A retainer for the axle carrying sleeve of a steering knuckle having cuffs embracing the eyes of the knuckle bracket in overlapping relation with the adjacent extremities of the sleeve, said cuffs having side extensions lying in contact with the side surfaces of the bracket arms, and means for securing the inner ends of said extensions in a fixed relation with the axle, the extensions of the lower cuff being provided with ears for engagement with the undersurface of the axle and the extensions of the upper cuff being provided with a back extension bearing upon the upper side of the axle, said fastening means consisting of ears extending upward from the extensions of the lower cuff, a cam carried between and pivotally mounted on said ears for engagement with the back extension of the upper cuff, said cam being provided with a handle, said back extension being provided with up-standing spaced keepers between which said handle is disposed in the cam actuating position, and a retainer spanning said ears above said handle to secure the latter in cam retaining position.

In testimony whereof he affixes his signature.

JAMES G. WILCOX.